INVENTOR
RUBEN DEL CASTILLO
BY
ATTORNEY

INVENTOR
RUBEN DEL CASTILLO
BY
ATTORNEY

Oct. 6, 1970  R. DEL CASTILLO  3,532,895
AUTO INTERVAL STARTER

Filed March 26, 1969  3 Sheets-Sheet 3

INVENTOR
RUBEN DEL CASTILLO
BY
ATTORNEY

United States Patent Office 3,532,895
Patented Oct. 6, 1970

3,532,895
AUTO INTERVAL STARTER
Ruben DelCastillo, 1700 Bradley,
St. Paul, Minn. 55117
Continuation-in-part of application Ser. No. 544,602,
Apr. 22, 1966. This application Mar. 26, 1969,
Ser. No. 810,467
Int. Cl. F02h *11/08;* H02p *9/02*
U.S. Cl. 290—38
10 Claims

ABSTRACT OF THE DISCLOSURE

A clock controls two timing members operable to start a vehicle engine to run for predetermined periods of time. One timer member starts the engine at equal time intervals, while the other starts the engine prior to a present time when the car is to be driven. The second of said timer members may be used to start the car in warm weather to actuate an air conditioner or a heater, depending upon the weather. The first timer member is used only in cold weather to keep the engine warm. The times of operation are adjustable.

---

This is a continuation in part of application Ser. No. 544,602 filed Apr. 22, 1966 for Auto Interval Starter.

This invention relates to an improvement in auto interval starter and deals particularly with an apparatus for maintaining a vehicle in condition for easy starting and convenient use during cold weather.

Various types of devices have been produced which are designed to start a motor vehicle into operation when the temperature falls to a predetermined minimum, or when the ambient air falls below a certain temperature. In some instances, the systems are designed to start the vehicle engine into operation whenever the temperature in the cooling system decreases to a predetermined degree. In other cases, the vehicle operator may set an apparatus to start the vehicle sometime in advance of the time he desired to use the vehicle. Most of the devices are quite complicated and costly to apply. It is a purpose of the present invention to provide a structure and apparatus which may be produced at a relatively low cost and which will keep the vehicle from freezing up during cold weather, and which will also heat up the car preparatory to its intended use.

A further feature of the present invention resides in the provision of a device which may function to turn on an air conditioning unit somewhat in advance of the time the vehicle is to be used, so that the interior of the car will be cool and comfortable at the time it is used. In warm weather, it is usually unnecessary to keep the interior of the car cool during the period it is not in use. The present apparatus is so arranged that the interval starting unit may be disconnected without disturbing the apparatus capable of functioning to set the time at which the car is started to cool the interior thereof prior to use.

A feature of the present invention resides in the provision of an interval starting system of the type described which will start the engine of the vehicle at predetermined intervals depending upon a setting of the apparatus. As a result, at regular intervals, the vehicle engine is started and allowed to run for a period of time sufficient to keep the engine from becoming unduly cold. At the same time, the structure may be set so as to start the automobile engine at a certain time prior to the time when the car is to be driven. Usually, at this point, the vehicle engine is permitted to run for a somewhat longer period so as to heat the cooling system of the car and to permit the heater or air conditioning unit to heat or cool the car to the extent where it is comfortable to drive when the driver enters the car.

A further feature of the present invention resides in the provision of a circuit breaker of novel form which is designed to control the circuit to the vehicle engine, the starter, and other parts of the system. When the circuit is closed to the vehicle starter, current flows through the circuit breaker and heats a coil therein. If the circuit to the starter motor continues beyond a predetermined time limit, the heat acts to open the circuit breaker, and to turn off the system until it is manually reset. In other words, if the vehicle engine does not start within a predetermined maximum time period, the circuit is turned off in order to avoid danger of running down the vehicle battery.

A further feature of the present invention resides in the provision of a simple and effective means of controlling the period of time during which the vehicle engine will remain in operation. Means is provided for setting the peirod of time during which the engine will operate during each time interval. In other words, if the temperature is above zero, it may be desired to run the engine for a period of three or four minutes during each hour. On the other hand, if the weather is extremely cold, it may be desired to run the vehicle engine for a considerably greater length of time during each hourly period.

A further feature of the present invention resides in the provision of a simple means of adjusting the length of time the vehicle engine will operate prior to the time the vehicle is to be driven. Means is provided for setting this time interval so that the engine will run a time sufficient to heat or cool the body of the vehicle depending upon the weather.

These and other objects and novel features of the present invention will be more clearly and fully set forth in the following specification and claims.

In the drawings forming a part of the specification.

Figure 1:
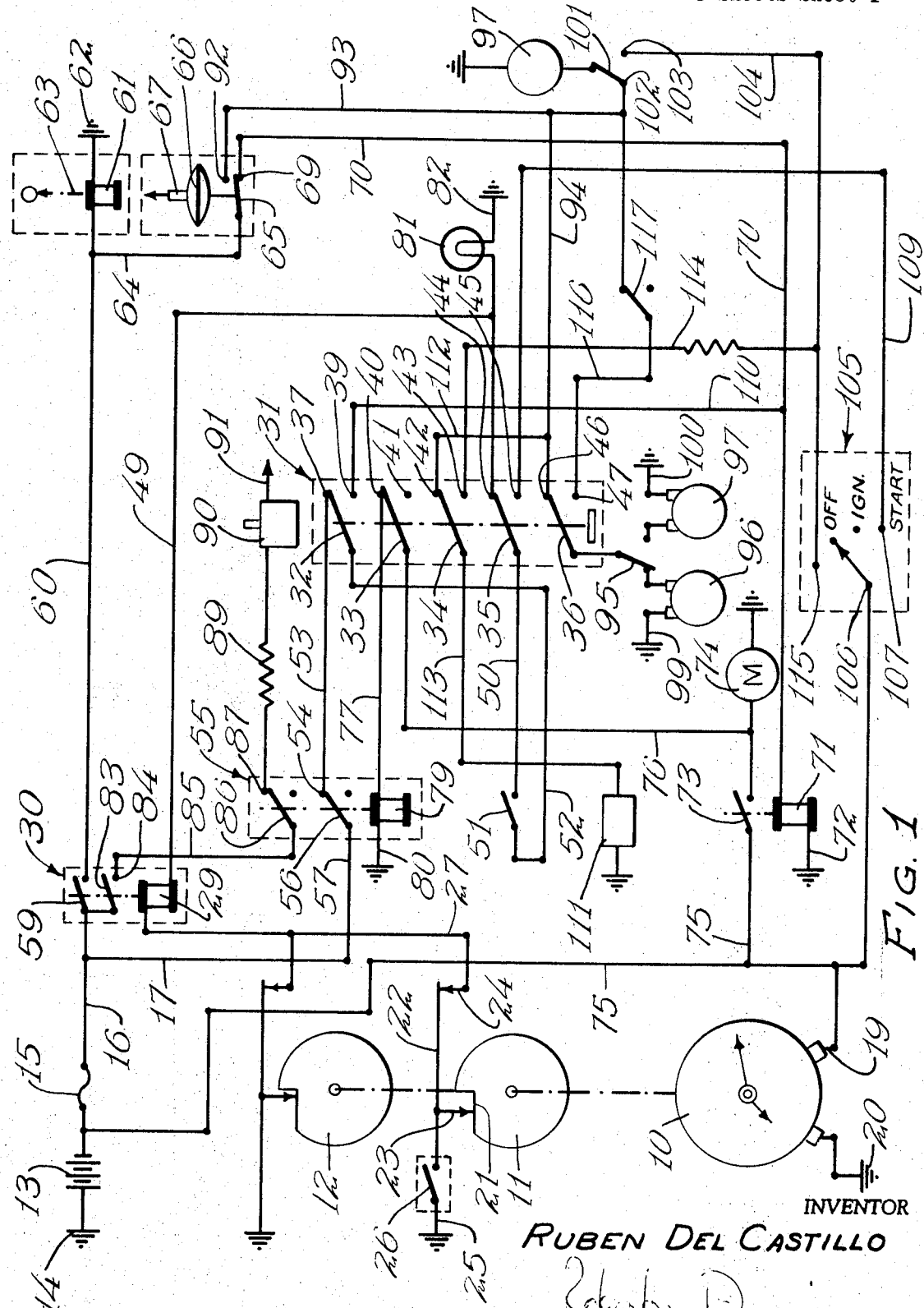
FIG. 1 is a diagrammatic view of the wiring system of the apparatus showing the general arrangement of parts therein.

The system is indicated diagrammatically in FIG. 1 of the drawings. An electric clock 10 is shown driving a pair of timing members 11 and 12. The timing member 11 is diagrammatically illustrated as a disc which rotates one revolution each hour. The timing member 12 is diagrammatically illustrated as a disc which rotates once every twelve hours. In other words, the timing member 11 rotates at a speed corresponding to the minute hand of a clock, while the timing member 12 rotates at a speed similar to the hour hand of the clock.

A circuit extends from the battery 13 which is grounded as indicated at 14 through a fuse 15 and conductors 16 and 17 to a terminal 19 of the clock motor 10, the other terminal of which is grounded at 20 to complete the circuit. Thus the clock 10 operates continuously in the usual manner.

The timer member 11 is shown as having a wedge shaped notch 21 in its periphery. For the purpose of illustration, a resilient switch blade 22 is provided with a rubbing block 23 which rests on the arcuate periphery of the disc and which is normally operable to hold the switch blade 22 in spaced relation to the cooperable contact 24. The blade 22 is connected to ground at 25 through a manually operable switch 26 which may be opened to prevent the timing member 11 from affecting the circuit. The fixed contact 24 is connected by a conductor 27 to a control relay coil 29 of the control relay 30.

The broken line 31 identifies a five pole double throw manually operable switch which is manually moved to the position indicated when the timing unit is to be employed, and which is moved to its other extreme position when the system is not in operation. The switch 31 may be considered the main controlling switch of the apparatus, while the switch 26 may be used to cut out the interval timing unit when it is so desired.

The switch 31 includes a series of switch blades 32, 33, 34, 35, and 36 which are connected in ganged relation. The switch blade 32 is movable between a pair of terminals 37 and 39. The switch blade 33 is movable between a terminal 40 and an unconnected terminal 41. A switch blade 34 is movable between contacts 42 and 43. The switch blade 35 is movable between a pair of fixed contacts or terminals 44 and 45. The switch blade 36 is movable between the contact terminals 46 and 47.

The control relay coil 29 which is actuated by rotation of the timer members 11 and 12 is connnected by conductor 49 to terminal 44 which is connected by switch blade 35 to a conductor 50 leading to a switch 51. The switch 51 is a "neutral" switch normally present in most modern motor vehicles, and which is closed when the gear shift level is in neutral gear.

The switch 51 is connected by a conductor 51 to the switch blade 32 which is in engagement with the terminal 37. The terminal 37 is connected by conductor 53 to a terminal 54 of a normally closed time delay relay which is indicated in general by the numeral 55. The armature 56 of the relay which engages the terminal 54 is connected by conductor 57 to the positive line wire 17. Thus when the switch 26 is closed, and when the rubbing block 23 of the timer switch blade 22 is in engagement with the notch 21, a circuit is closed to the control relay 29.

The actuation of the relay 30 controlled by the coil 29 closes circuits designed to start the vehicle engine. The armature 59 of the relay 30 connects the positive line wire 16 to a conductor 60 leading to a solenoid coil 61, the other terminal of which is grounded as indicated at 62. The solenoid 61 actuates a rod 63 connected to the engine throttle control to open up the throttle to a speed somewhat above normal idling speed. The rod 63 functions merely to cause the engine to rotate at a speed sufficient to prevent the discharge of the battery when the engine is operating with the heater or air conditioner is in full operation.

The conductor 60 also closes a circuit to a conductor 64 leading to a switch 65 controlled by a diaphragm 66 or other suitable vacuum actuated switch controlling means. The diaphragm 66 is connected by a conduit 67 to the vehicle intake, and the partial vacuum in the intake acts to move the switch blade 65 from one extreme position to another when the engine starts and develops suitable vacuum in the intake manifold. When the engine is not in operation, the switch blade 65 engages a terminal 69 connected by a conductor 70 to a starter relay or solenoid 71, the other terminal of which is grounded as indicated at 72. The solenoid 71 controls a switch 73 connected to the positive line wire 75 connected to the battery 13. The starter motor 74 is connected to the switch 73, and the other terminal is grounded. When the starter solenoid 71 is closed, a circuit is closed through the line wire 75 through the switch 73 and through a conductor 76 to the master switch blade 33 which is in contact with the terminal 40. The terminal 40 is connected by a conductor 77 to the coil 79 of the time delay relay 55, the other terminal of which is grounded as indicated at 80.

As current flows in the above named circuit 75 to the starter motor 74, the coil 79 generates heat, and after a predetermined period of time, the coil 79 opens an internal thermostatic switch (not shown) in the time delay relay, opening the circuit to the control relay 30. An indicator light 81 is connected between the control conductor 49 and ground as indicated at 82 to indicate when the circuit is in operation.

The control relay 29 also controls the operation of an armature 83 which, upon energization of the coil 29, engages a contact 84. The armature 83 thus closes a circuit from the line wire 16 through a conductor 85 to a switch blade 86 in ganged relation with the switch blade 54 controlled by the time delay relay 55. The switch 86 is in normal engagement with the terminal 87 connected through the ignition resistor 89 to the coil 90. The coil 90 is connected to the vehicle distributer (not illustrated) by conductor 91.

When the vehcile engine starts, the vacuum switch 66 moves the switch blade 65 into contact with a terminal 92 connected by a conductor 93 and a conductor 94 to the master switch terminal 46. This terminal is connected through the switch blade 36 to a switch 95 which may be actuated to close a circuit to a heater unit 96 or an air conditioning unit 97, the other terminals of which are grounded as indicated at 99 and 100. This circuit may be used to control a built-in air conditioning unit. In the event the air conditioning unit is what is known to the trade as a "hang on unit" the added unit may be controlled by a switch 101 which is engageable with a terminal 102 connected to the conductor 93 for automatic operation, or may be engaged with the terminal 103 connected by conductor 104 to the accessory terminal 115 of the ignition switch 105 for manual operation.

When the master switch 31 is in its opposite extreme position, a circuit is closed through the positive terminal 106 of the ignition switch 105 and starting terminal 107 through conductor 109 to switch terminal 45. The circuit continues through switch arm 35, conductor 50, switch 51, and conductor 52 to switch arm 32. This switch arm is now in connection with terminal 39 which is connected by conductor 110 to conductor 70 leading to the starting solenoid 71.

The alternator regulator 111 functions in either position of the master switch 31. When in the position illustrated, a circuit extends from the vacuum actuated switch terminal 92 through conductors 93 and 94 and a conductor 112 to the terminal 42. This terminal is connected by switch arm 34 to conductor 113 leading to the alternator regulator 111. When the switch is in the opposite direction, the master switch blade 34 is in contact with the terminal 43 which is connected by conductor 114 to conductor 104 leading to the accessory post 115 of the ignition switch. When the master switch is in off position, the terminal 47 may be connected by conductor 116 to a manually operable switch 117 capable of controlling the circuit to the heater or air conditioner.

Figure 2:
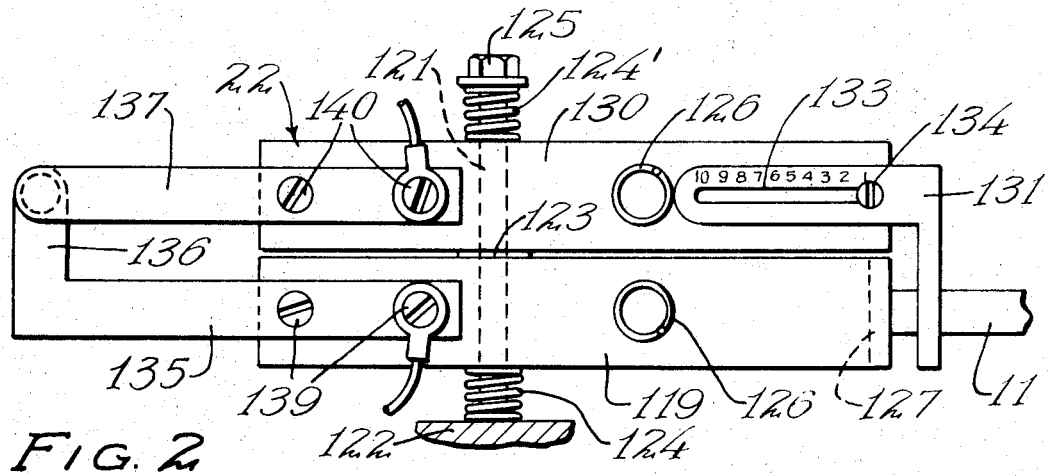
FIG. 2 is a top plan view of a portion of the interval timer, showing the means of adjusting the length of time the circuit to the vehicle engine will be closed during each time interval.
Figure 3:
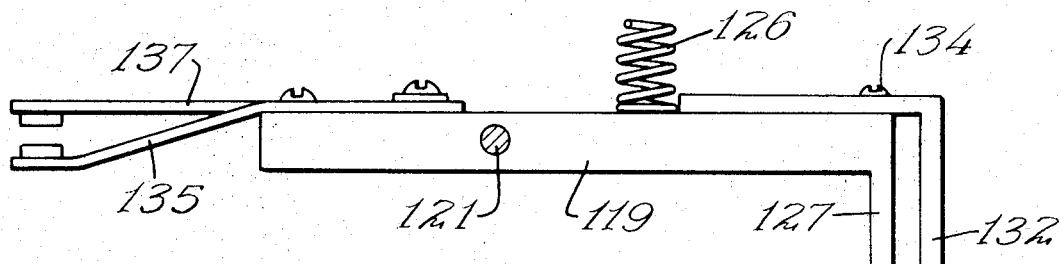
FIG. 3 is an enlarged diagrammatic side elevational view showing the switch mechanism used for controlling the length of time interval during which the vehicle engine will operate.
Figure 4:
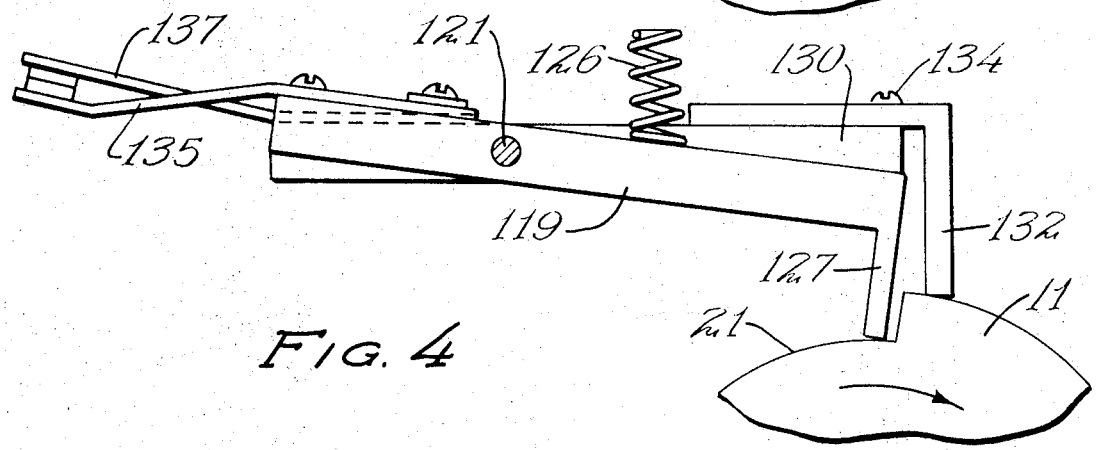
FIG. 4 is a view similar to FIG. 3 but showing the switch mechanism in position to actuate the vehicle engine.

While the timing member 11 has been indicated merely as a notched disc in FIG. 1 of the drawings, it is actually preferably formed as indicated in FIGS. 2, 3, and 4 of the drawings. As indicated in FIG. 2, the switch, which may be indicated in general by the numeral 22, includes a pair of side by side arms 119, 130 which are pivotally supported upon a common pivot shaft 121 mounted as indicated at 122 to a fixed portion of the unit. The arms 119 and 130 are separated by a washer 123, and the arms are held in proper position by springs 124 and 124', the first of which is interposed between the fixed support 122 and the arm 119 and the second of which is interposed between the arm 130 and a nut 125. The ends of the arms 119 and 130 are urged in a clockwise direction as viewed in FIGS. 3 and 4 of the drawings and against the disc 11 by spring means diagrammatically illustrated at 126. The arm 119 is provided with a fixed rubbing block such as 127, while the arm 130 is provided with an angular extension 131, one end 132 of which also forms a rubbing block. The upper surface of the angular extension 121 is slotted as indicated at 133, and the position of the extension may be held in adjustment by a set screw 134 extending through the slot 133 and into the arm 130.

Arms 119 and 130 which are preferably made of insulating material are provided with interengaging contact arms. The arm 119 is provided with a flexible projecting arm 135 which has an angularly turned end 136 (see FIG. 2) to engage beneath the resilient contact arm 137 secured to the arm 130. The resilient arms 135 and 137 are connected to their respective arms 119 and 130 by bolts 139 and 140 to which the flexible conductors may be attached. The rubbing block 127 of the arm 119 engages the disc 11 somewhat in advance of the rubbing block 132 of the arm 130, in the direction of rotation of the disc and the distance between the two rubbing blocks may be adjusted by movement of the angular member 131 longitudinally of the arm 130. When the rubbing blocks of both arms are in engagement with the arcuate periphery of the disc 11, the contact arms 135 and 137 will be spaced apart to open the circuit between these arms. However, when the rubbing block 127 drops into the notch 21, as indicated in FIG. 4 of the drawings, the spring means 126 will urge the contact arms into engagement, to close the circuit between the arms. This contact will continue until the rubbing block 132 drops into the notch 21, at which time the spring means 126 on engaging the arm 130 will again separate the contacts as indicated in FIG. 3.

Figure 5:
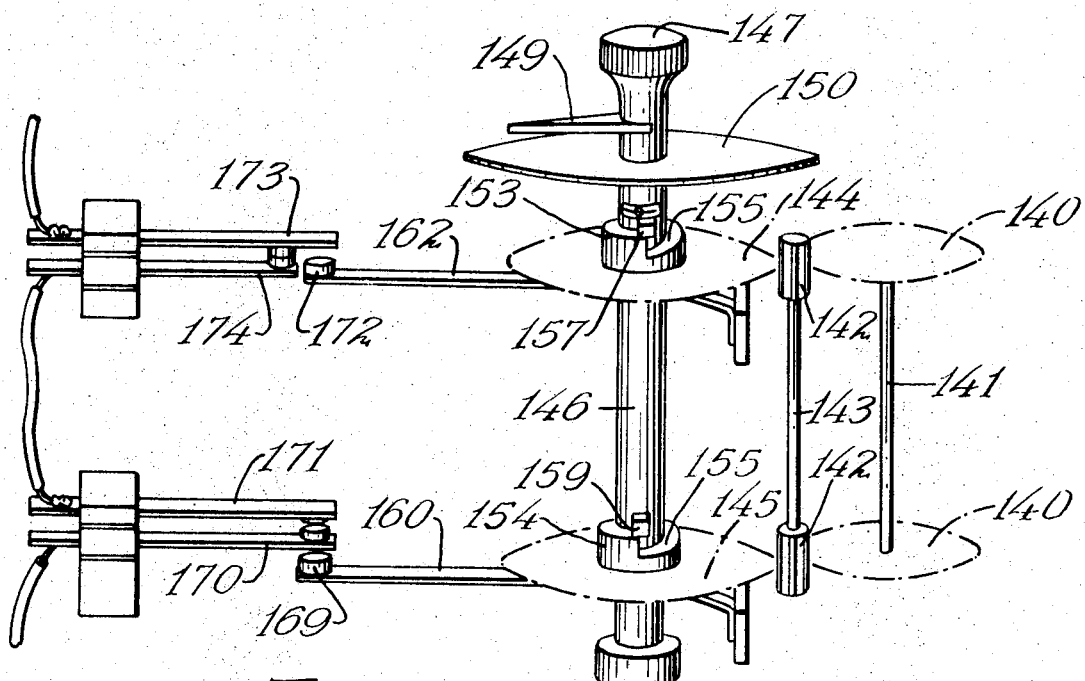
FIG. 5 is a diagrammatic perspective view showing the apparatus designed for use in setting the time at which the vehicle engine will be turned on after a period of disuse.
Figure 6:
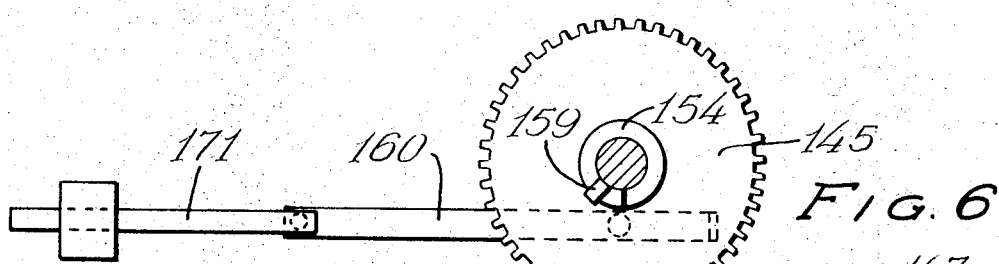
FIG. 6 is a diagrammatic planed view of the apparatus shown in FIG. 5, the setting shaft being shown in the section.
Figures 7, 8:
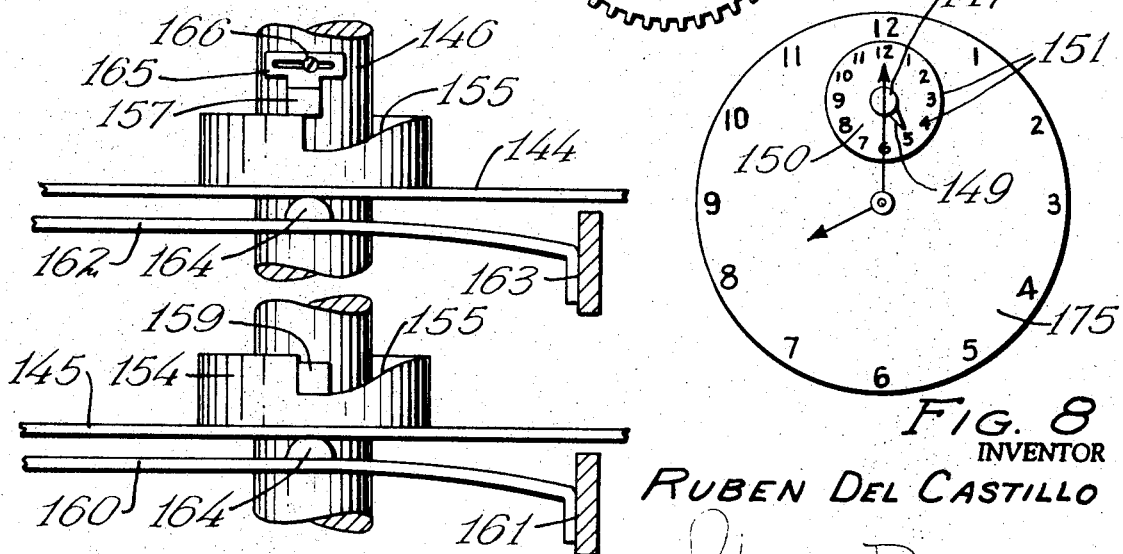
FIG. 7 is an enlarged diagrammatic view showing a portion of the structure shown in FIG. 5.
FIG. 8 is a diagrammatic view of the arrangement of time clock and means for setting the time at which the vehicle engine will be started prior to the use of the vehicle.

FIGS. 5, 6 and 7 of the drawings shows the manner in which the interval of operation of the vehicle engine prior to driving the vehicle may be varied. While the clock mechanism is not illustrated in its complete form due to the fact that clock mechanisms are well known in the art, FIG. 5 illustrates a pair of gears 140 mounted upon a shaft 141 which is rotated by the clock mechanism once every twelve hours. The gears 140 operate through pinions 142 mounted upon a shaft 143 parallel to the shaft 141. In turn, the pinions 142 drive gears 144 and 145 mounted upon rotatably supported pivot provided at one end with a knob 147 by means of which the pivot may be turned. A pointer 149 is provided on the shaft 146 movable over a dial 150 having numerals thereon similar to the angularly spaced numerals on a clock or watch dial. The dial 150, numerals 151 and pointer 149 are diagrammatically illustrated in FIG. 8 of the drawings.

Each of the gears 144 and 145 are provided with an integral hub, the hubs being indicated at 153 and 154. Each hub is provided with a cam surface 155 on the end thereof opposite that attached to the gear. A rubbing block 157 rides upon the surface of the hub 153. A rubbing block 159 rides upon the surface of the hub 154. The rubbing blocks are secured to the pivot shaft 146 and are adjusted relative to the cam surfaces of the hubs by rotation of the pivot shaft.

The gear 145 is urged against the rubbing block 159 by a spring arm 160 as is best indicated in FIG. 7 of the drawings. The spring arm 160 is anchored at one end as indicated at 161. A similar spring arm 162 is anchored at one end as indicated at 163, and underlies the gear 144. The spring arm 162, similarly to the spring arm 160, usually acts through a contact member 164 in its engagement with the respective gear.

As indicated in FIG. 7, the rubbing block 157 is mounted upon a slotted arcuate bracket 165 which is held to the pivot shaft 146 by a screw 166 or other suitable means. Thus the angular relation between the blocks 159 and 157 may be adjusted to provide a variable time interval.

As is diagrammatically illustrated in FIG. 5 of the drawings, the rotation of the gear 145 is moving the notched cam surface 155 of the hub 145 beneath the rubbing block 159. When the rubbing block coincides with the cam surface 155, the spring arm 160 will raise the gear 145 allowing the free end of the spring arm 160 to spring upwardly. The arm 160 which is provided at its extremity with an insulation block 169 engages the lowermost blade 170 of the pair of contact blades, swinging the blade 170 up into engagement with the upper contact blade 171 to close a circuit.

An examination of FIG. 5 will also show that the spring arm 162 supported beneath the upper gear 144 is provided with an insulation block 172 at its extremity, this block 172 being engageable with the upper blade 173 of a pair of contact blades, the lower contact blade 174 being normally in contact therewith. Due to the fact that the contacts 173 and 174 are normally closed, the closing of the contacts 170 and 171 will close the operating circuit to the control relay in the manner which has been described. This acts to start the vehicle engine in the manner which has also been described. However, as soon as the rubbing block 157 coincides with the cam surface 155 of the upper hub 153, the spring arm 162 will raise the gear 144, and the end 172 of the spring arm 162 will raise the contact blade 173 out of contact with the lower blade 174, thus, breaking the circuit and terminating the period of time during which vehicle engine is in operation.

FIG. 8 of the drawings diagrammatically illustrates the arrangement of the dial 150 relative to the clock dial 175 indicates the time of day, the clock operating continuously. The ends of the clock are arranged to indicate 8:00 in the morning. The pointer 149 is positioned to indicate 5:00 in the afternoon, which is near the time when the driver will enter the car and drive away.

The device is set into operation by actuation of the master switch 31, it being understood that the switch 26 is closed as usual for winter weather, and the switch 95 being positioned to actuate the heater 96. Each hour, the timing means 11 will close the circuit to the control relay 30 and start the vehicle engine into operation for a period of perhaps 5 minutes or a time sufficient to warm the vehicle engine. The heater will also be on during this period of time, but the time may not be sufficient to warm the car interior to a comfortable temperature. When the time comes to warm the vehicle prior to driving, the timing means 12 will come into operation, and will keep the vehicle engine running, for a considerably longer period of time. Thus the vehicle interior is warm and comfortable by the time the driver reaches the car.

During the summer months, the circuit may be set to operate the air conditioner 97 instead of the heater 96. The circuit is set in much the same manner. For example, if the vehicle is to be used to twelve o'clock, the pointer 149 will be set at the numeral 12 or slightly before. At the proper time, the vehicle engine will start and set the air conditioning unit into operation. Thus when the driver reaches the car, sufficient time will have lapsed to have the interior of the car at the comfortable temperature.

It is usually not necessary to cool the car at intervals between the time the vehicle is parked and the time it has again been driven, as modern air conditioning units are capable of quickly reducing the temperature in the vehicle, and as it is not necessary to run the engine at intervals in order to prevent the oil from becoming extremely stiff as in cold weather. Accordingly when using the air conditioning unit, the switch 26 may be opened so that the hourly operation of the timing means 11 has no effect on the system. Furthermore, where the temperature is not excessively low, and where it is not felt necessary to start the car at hourly intervals, the switch 26 may be opened during winter weather so that the engine will be started and the vehicle heated only at the end of a predetermined time period.

I claim:
1. An automatic vehicle starting system for a vehicle having an internal combustion engine having an intake manifold, a starter motor, starter solenoid means controlling said starter motor, a source of current supply, and an ignition system, the system including;
   a five pole, double throw master switch,
   a clock,
   a first timer member connected to said clock for rotation thereby at one rotative speed,
   a second timer member connected to said clock for rotation thereby at a rotative speed substantially slower than the rotative speed of said first timer member,
   first normally open switch means controlled by said first timer member to close for a short interval of time during each revolution of said first timer member,
   second normally open switch means controlled by said second timer member to close for a short interval of time during each revolution thereof,
   means on each of said timer members for actuating the associated switch,
   a control relay including a control relay coil,
   a first circuit including said source of current supply, said control relay coil and said normally open switches and operable, when said normally open switches are closed, to energize said control relay,
   a vacuum actuated switch connected to said intake manifold and movable between two positions, one in the absence of vacuum and the other with presence thereof,
   normally open control relay switch means closed by actuation of said control relay coil,
   a second circuit including said current supply, said control relay switch means, said vacuum actuated switch in said one position, and said starter solenoid,
   a car air temperature controlling device, and
   a third circuit including said current supply, said control relay switch means, said vacuum actuated switch in said other position, and said air temperature controlling device.

2. The structure of claim 1 and including a fourth circuit including said current supply, said control relay switch means, and a solenoid including a carburator throttle control rod actuated upon actuation of said solenoid to increase the throttle opening.

3. The structure of claim 1 and in which said circuits are all controlled through said master switch.

4. The structure of claim 1 and including means for regulating the length of time said normally open switches will remain open.

5. The structure of claim 1 and in which said first timer member includes a disc having a notch in its periphery, and in which said first normally open switch means includes a pair of switch arms each having a rubbing block engaging the periphery of said discs and the rubbing blocks being in angularly spaced relation, the engagement of one rubbing block with said notch closing said first circuit and the subsequent engagement of the other rubbing block with said notch opening said first circuit.

6. The structure of claim 5 and in which said rubbing blocks are spaced apart an adjustable distance.

7. The structure of claim 1 and in which said air temperature controlling device includes a heater and an air conditioning unit, and including switch means for connecting either said heater or said air conditioning unit in said third circuit.

8. The structure of claim 7 and including means for regulating the length of time said normally open switches remain closed.

9. The structure of claim 1 and in which said second timer member includes a pair of rotary members, and including means on one of said rotary members for closing said second normally open switch, and means on the other of said rotary members for reclosing said second normally open switch.

10. The structure of claim 9 and including means for adjusting the relationship between said rotary members to vary the time interval during which said second normally open switch remains closed.

References Cited

UNITED STATES PATENTS

| | | | |
|---|---|---|---|
| 2,698,391 | 12/1954 | Braden et al. | 290—37 X |
| 3,043,963 | 7/1962 | Teikari | 290—38 X |

ORIS L. RADER, Primary Examiner

W. E. DUNCANSON, JR., Assistant Examiner

U.S. Cl. X.R.

290—41